Oct. 14, 1924.  
E. A. ROBINSON  
1,511,300  
TUBULAR MOUNT FOR TRAIN CONNECTERS  
Filed May 17, 1922  2 Sheets-Sheet 1
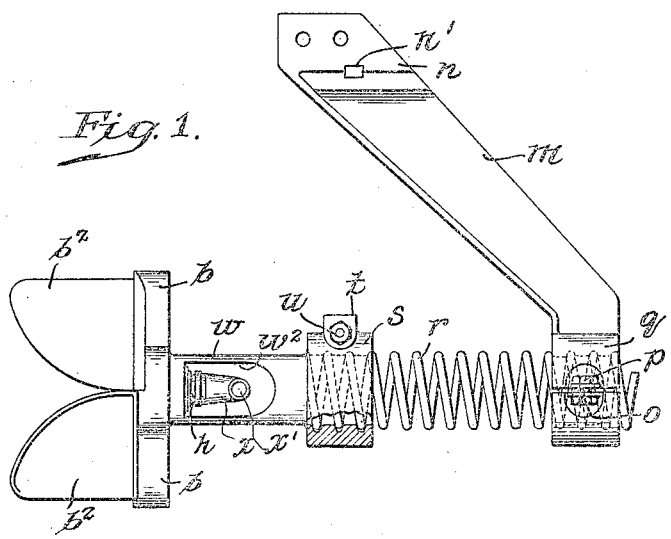
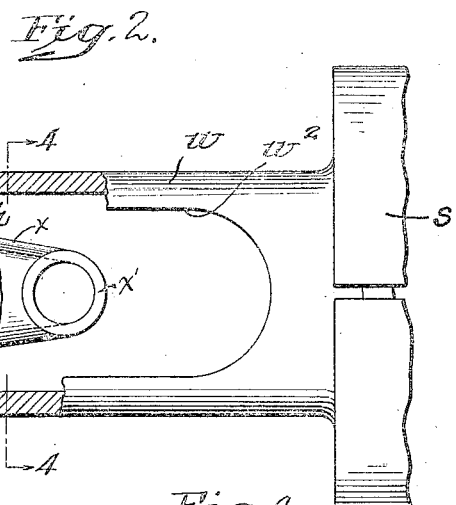
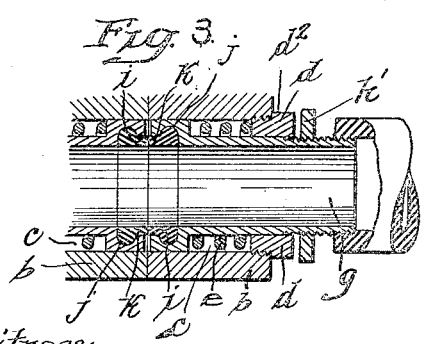
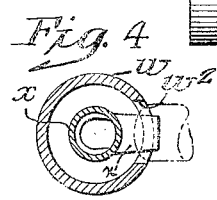
Inventor:  
Edward A. Robinson.

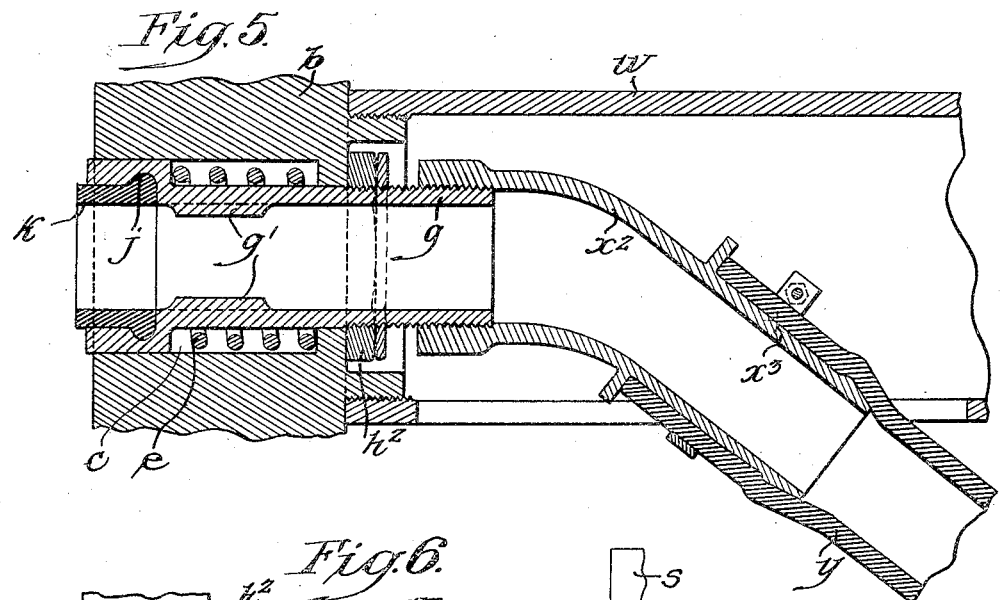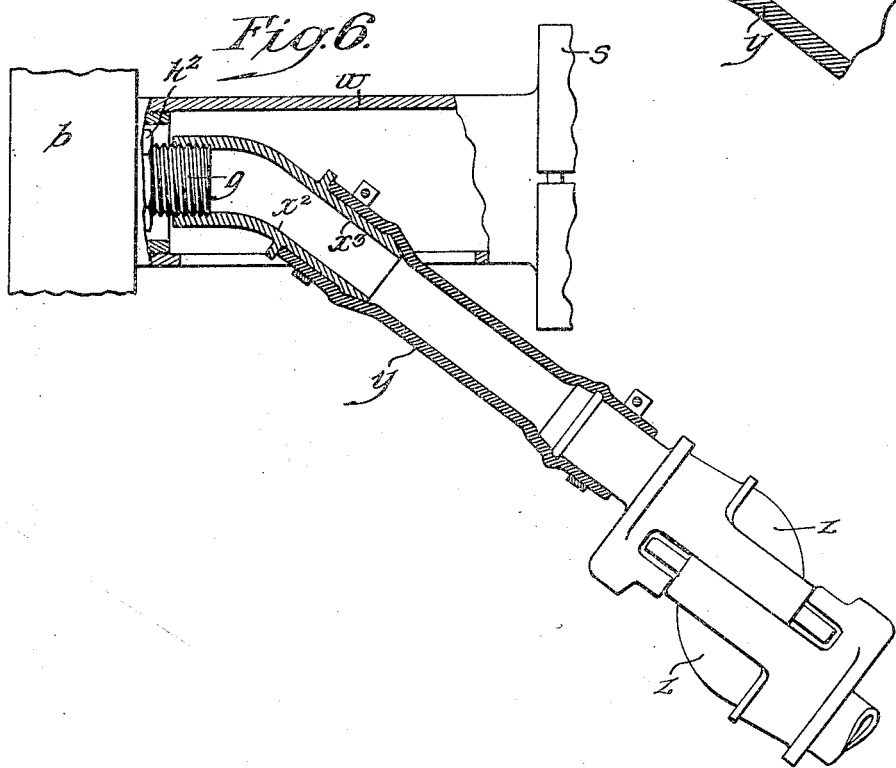

Patented Oct. 14, 1924.

1,511,300

UNITED STATES PATENT OFFICE.

EDWARD A. ROBINSON, OF MONTREAL, QUEBEC, CANADA, ASSIGNOR OF ONE-HALF TO HIMSELF AND ONE-HALF TO ELLISON A. WORKMAN, OF MONTREAL, CANADA.

TUBULAR MOUNT FOR TRAIN CONNECTERS.

Application filed May 17, 1922. Serial No. 561,705.

*To all whom it may concern:*

Be it known that I, EDWARD A. ROBINSON, a citizen of the United States, residing at Montreal, Canada, in the Province of Quebec, Canada, have invented a certain new and useful Tubular Mount for Train Connecters, of which the following is a specification.

My invention relates to automatic connecters for uniting the air and steam train pipes of adjoining cars in railway trains.

The purpose of my invention is to support the head by a tubular yoke having a lateral opening for access to one of the pipe connections.

A further purpose is to provide a flexible connection from a sliding train pipe terminal locked against rotation in a connecter head, so that the flexibility of the pipe serves the same purpose as the turning of the terminal and, preferably, to mount a disconnection fitting upon the connection.

A further purpose is to mount a tubular yoke, or support for a connecter head upon a spring connecting with the bracket.

Further purposes will appear in the specification and in the claims.

I have preferred to illustrate my invention by one general form only, selecting a form which has proved to be practical, efficient and inexpensive, and which at the same time well illustrates the principles of my invention.

Figure 1 is a side elevation, partly broken away, showing the preferred form of my invention.

Figure 2 is an enlarged side elevation, largely in longitudinal section, showing a portion of the structure of Figure 1.

Figure 3 is a longitudinal section, partly in side elevation showing mating heads in contact, with the gaskets joined.

Figure 4 is a section upon line 4—4 of Figure 2 upon a reduced scale.

Figure 5 is a fragmentary longitudinal section showing a flexible train pipe connected directly to a train pipe terminal.

Figure 6 is a fragmentary section on a smaller scale in which such a flexible connection terminates in a Westinghouse coupler for connection to the corresponding coupler upon a train pipe.

In the drawings similar numerals indicate like parts.

Describing the construction shown, for purposes of illustration and not in limitation, the head $b$ is provided with one or more chambers $c$ extending parallel with the track and with each other where more than one is used. These are for the terminals of train pipes. These pipes are usually one or two in number where they are used on freight cars and three in number for passenger service. They are referred to herein generally as train pipes without regard to the specific use intended. The chambers shown in Figures 2 and 3 are for a central and an end head terminal respectively.

These chambers are circular in cross section and extend through the head from the front face to the rear, so arranged as to present a rear threaded opening $b'$ for a removable abutment upon a collar or ring $d$ or $d'$ in the figures. In these figures the collar is screwed to place and the outer portion $d^2$ is formed as a wrench hold so that it can be inserted or withdrawn as required.

The outwardly facing chambers, however formed, are shown as of uniform diameter, to receive bushings or sleeves here referred to generally as train pipe terminals, illustrated at $g$. The front end of each sleeve has a head $f$ of a diameter to fit and slide within the chamber, while the rest of the sleeve is of reduced diameter fitting the interior of the collar $d$ (or $d'$), both fits being free enough to permit movement, at the same time that they are close enough to give sufficient guidance.

An expansile helical spring $e$ is also contained within each chamber, encircling the bushing, one end resting against a stop in the form of the collar or shoulder $d$ or $d'$ and the other end against the head $f$ upon the sleeve. The effect of this, if unrestrained, would be to project the sleeve forwardly until the spring ceases to expand, giving a considerable projection of the forward end of the sleeve beyond the face of the head, but so far as heretofore described, unrestricted and lacking in control and without initial or normal compression of the spring.

In the form shown these train pipe terminals are intended to be inserted and removed from the rear of the head, by removing the collar $d'$ offering a great advantage in the possibility of replacement of gaskets without uncoupling the cars. For this purpose the thread-hold of the collar within the head should be sufficiently long to maintain connection with release of the collar until the spring ceases to expand, and, when the parts are to be replaced, to start the threads before compression of the spring begins.

Whatever the forms as to this, the extent of normal projection of each terminal through and beyond the front face of the connecter head (directly determining the projection as compared with the coupler) may be adjusted by a stop $h$, which is most conveniently formed as a nut and may to advantage comprise lock nuts screwed upon the inner end of the bushing. The nut or nuts tighten the compression spring and consequently limit the forward position of the train pipe terminal beyond the face of the connecter head. In addition to the stop $h$ upon the threaded sleeve, $g$, the train pipe coupler is screwed upon the sleeve end and acts as a limit to outward movement of the lock nut or lock nuts.

The outer end of each terminal (bushing) is internally bored at I and further grooved at $j$ to provide for insertion of a gasket ($k$, when intended for air) which fits within the bore and groove and projects at the front far enough to provide for a sufficient degree of compression of the gasket when it engages a corresponding gasket of another connecter head. The gasket corresponds in its interior diameter in each case with the interior of the bushing $g$, and each of the terminals with the gasket because of the bodily movement compressing the spring constitutes what may be termed a movable gasket sleeve.

The head is carried by a bracket $m$ which is tightened at the upper end at $n$, by a wedge $n'$ and at its lower end is threaded to receive a spring. The threaded member is split at $o$ to form a clamp tightened about the spring by a bolt $p$ so that a split nut $q$ is formed at the lower end of the bracket.

The spring $r$ at its opposite end is threaded into a corresponding split nut $s$ split at $t$, and tightened by a nut $u$. This split nut $s$ forms one end of a tubular support $w$, which is slotted at $w^2$ so as to permit insertion of the pipe terminal $x$. Ears or wings are shown at $b^2$.

The bracket construction shown has the advantage of preventing rotation of sleeve $g$, maintaining it in position, and holding up the pipe connecting therewith.

In assemblage the spring and collar are placed upon the pipe terminal followed by the nut $h$. The parts are then inserted from the rear, and the collar is secured to position. The nut $h$ is then tightened until the desired compression of spring $e$ is secured. The fitting is then applied, and the terminal is screwed into the fitting from the front by any suitable spanner or other wrench which may engage with the surface, with lugs $g'$ or within openings in the front face or interior of the terminal.

The fitting may be finished in any suitable manner for connection of the car train pipe, and it makes no difference whether the part $x'$ engages with the walls of the recess to prevent rotation and to insure the same position of the parts for repeated engagements, or whether the train pipe engages with these walls to prevent effective rotation. In either event tearing of the gaskets by attempted turning while the cars are coupled and undesirable change of the gasket position are avoided.

In Figures 5 and 6 the fittings $x^2$ terminate in nipples $x^3$ and are connected by any ordinary clamp with a flexible hose $y$. In Figure 6 this hose carries a coupler $z$ for connection with the corresponding coupler of a train pipe.

The fittings $x^2$ upon the intermediate terminals are curved to give better access to the stop nut $h$. Those upon the end terminals may also be curved to advantage. The invention may be applied to heads having a single terminal only, as in some freight service, or to heads having two or more terminals.

The hose $y$ allows the coupler $z$ to be swung to any desired position and through any desired curve of movement for coupling.

It will be obvious that other forms of laterally-open hollow and preferably tubular supports may be used, connecting with the head by specifically different forms of construction according to the whim or need of the designer but embodying all or a part of my invention, and I desire to include herein all such changes as come within the reasonable spirit and scope of my invention.

Having thus described my invention what I claim as new and desire to secure by Letters Patent is:—

1. In a support for train pipe connecters, a head terminating in a threaded boss having a passage therethrough for a train pipe terminal, a hollow support for the head adapted to screw upon the boss having an interior thread at the rear thereof, and having lateral access to the interior thereof, and a resilient mount for the support engaging with the said thread.

2. In a support for a train pipe connecter head, a connecter head having a rearward projection, a laterally open hollow support connected with the said projection, a resilient mount for said support, and a train pipe terminal adapted to extend within the interior of the support free to turn slightly about its axis, and prevented from extended rotation by the walls of the support.

3. A train pipe connecter head and mount, comprising a head having a cylindrical rearward projection, a laterally apertured cylindrical support engaging the head at the projection, a train pipe connection having a fitting extending through the lateral opening free to turn slightly about its axis, and prevented from extended rotation by the walls thereof, and a train pipe terminal within the head engaging the fitting.

4. A train pipe connecter head and mount, comprising a head having a cylindrical rearward projection, a laterally apertured cylindrical support engaging the head at the projections, a train pipe connection having a fitting extending through the lateral opening free to turn slightly about its axis, and prevented from extended rotation by the walls thereof, a train pipe terminal within the head engaging the fitting, a spring for said support threaded thereinto, and a clamp for said spring rigid with the support, to hold the spring in position.

5. In a train pipe connecter, a head having a threaded portion at the rear, a tubular carrier fitting the threaded portion and laterally apertured, a train pipe connection passing through the aperture and a resilient support for the carrier.

6. A train pipe connecter, a connecter head having an opening through it, a train pipe terminal slidable longitudinally of its axis through the said opening, a spring pressing the terminal forwardly, a fitting rigid with said terminal, the terminal and fitting being free to move slightly about its axis and restrained from extended oscillation and a flexible hose connected with said fitting.

7. In a train pipe connecter, a connecter head having an opening through it, a train pipe terminal slidable longitudinally of its axis through the said opening, a spring pressing the terminal forwardly, a fitting rigid with said terminal, the terminal and fitting being free to move slightly about its axis and restrained from extended oscillation, a flexible hose connected with said fitting and a coupler connected to the other end of said hose.

8. In a train pipe connecter, a connecter head having an opening through it, a train pipe terminal slidable longitudinally of its axis through the said opening, a spring pressing the terminal forwardly, a fitting rigid with said terminal and at an obtuse angle thereto, the terminal and fitting being free to move slightly about its axis and restrained from extended oscillation and a flexible hose connected with said fitting and a coupler connected to the other end of the hose.

9. In a train pipe connecter, a connecter head, a train pipe terminal longitudinally movable therein, an adjustment for the extent of normal forward movement of said terminal, a spring pressing said terminal forwardly, a fitting secured to the rear of the terminal, a flexible hose mounted upon said fitting and means for preventing extended oscillation of said fitting and of the end of the hose connected to it.

EDWARD A. ROBINSON.

Certificate of Correction.

It is hereby certified that the name of the second assignee in Letters Patent No. 1,511,300, granted October 14, 1924, upon the application of Edward A. Robinson, of Montreal, Quebec, Canada, for an improvement in "Tubular Mounts for Train Connecters," was erroneously written and printed as "Ellison A. Workman," whereas said name should have been written and printed as *Ellison E. Workman*, as shown by the records of assignments in this office; and that the said Letters Patent should be read with this correction therein that the same may conform to the record of the case in the Patent Office.

Signed and sealed this 16th day of December, A. D. 1924.

[SEAL.] KARL FENNING,
*Acting Commissioner of Patents.*